United States Patent [19]

Badesha

[11] 4,411,698
[45] Oct. 25, 1983

[54] PROCESS FOR RECLAIMATION OF HIGH PURITY SELENIUM, TELLURTUM, AND ARSENIC FROM SCRAP ALLOYS

[75] Inventor: Santokh S. Badesha, Ontario, N.Y.

[73] Assignee: Xerox Corporation, Stamford, Conn.

[21] Appl. No.: 404,258

[22] Filed: Aug. 2, 1982

[51] Int. Cl.³ .................. C01B 19/02; C22B 3/00
[52] U.S. Cl. ............................... 75/121; 423/510
[58] Field of Search ............... 423/508, 509, 510; 549/10, 11, 332, 334, 335, 337, 338, 341, 372, 549/449, 511; 560/246; 75/121

[56] References Cited

U.S. PATENT DOCUMENTS

| | | | |
|---|---|---|---|
| 2,481,739 | 9/1949 | Goodman | 175/366 |
| 2,510,361 | 6/1950 | Addink | 175/366 |
| 2,860,954 | 11/1958 | Bueker et al. | 23/209 |
| 2,875,103 | 2/1959 | French | 117/200 |
| 3,723,105 | 3/1973 | Kitajima et al. | 75/134 H |
| 3,954,951 | 5/1976 | Buckley | 423/510 |
| 4,007,255 | 2/1977 | Buckley | 423/510 |
| 4,009,249 | 2/1977 | Buckley | 423/510 |
| 4,015,029 | 3/1977 | Elchisak | 427/76 |
| 4,121,981 | 10/1978 | Ward et al. | 204/38 R |
| 4,175,959 | 11/1979 | Karam et al. | 430/134 |

OTHER PUBLICATIONS

Zingaro, Ralph A. and Cooper, W. Charles *selenium* Van Nostrand Reinhold Co., 1974 pp. 62–63.
Paul, R. C. et al., "Preparation of Dialkyl Selenites" Indian Journal of Chemistry vol. 13 #3 Mar. 1975, pp. 292–294.
Bunton, C. A. & Hendy N. B. "Tracer Studies in Ester Hydrolysis Part 3" J. Chem. Soc., 1963 p. 3137.

Primary Examiner—O. R. Vertiz
Assistant Examiner—Robert L. Stoll
Attorney, Agent, or Firm—E. O. Palazzo

[57] ABSTRACT

This invention is generally directed to an improved process for reclaiming metallic elements in high purity from a source material containing these elements, which comprises providing a source material, converting the source material to mixture of oxides, reacting the oxides with an alcohol resulting in the formation of esters, and metallic oxides, subjecting the esters, subsequent to purification, to a reduction reaction, subsequently converting the metallic oxides to esters by reaction with a diol, and subjecting, subsequent to purification, the resulting esters to a reduction reaction.

20 Claims, 1 Drawing Figure

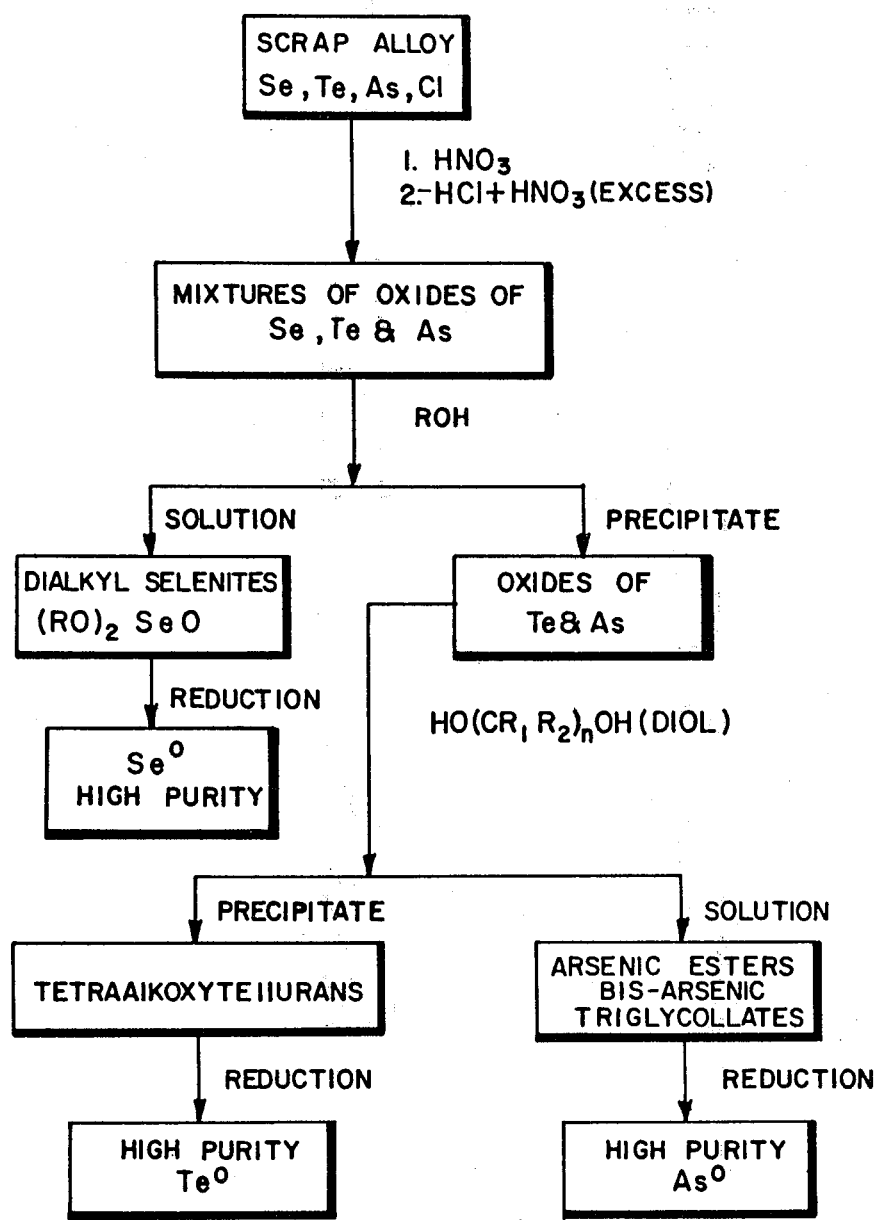

PROCESS FOR RECLAIMATION OF HIGH PURITY SELENIUM, TELLURTUM, AND ARSENIC FROM SCRAP ALLOYS

BACKGROUND

This invention is generally directed to improved processes for reclaiming certain metallic elements, such as selenium, tellurium and arsenic, and more specifically, the present invention is directed to a process for obtaining in high purity selenium, tellurium, arsenic and other materials from a source material, such as a scrap alloy material containing selenium, tellurium, arsenic, and in some instances halogen substances including chlorine. In accordance with the simple direct, economically attractive process of the present invention, there is obtained in one embodiment selenium, tellurium and arsenic in a purity of 99.999 percent, and pollution hazards as present with some prior art processes are eliminated. High purity materials produced in accordance with the process of the present invention are useful as imaging members, particularly as photoconductive members, in electrophotographic imaging systems, especially those where an electrostatic latent image is formed on the imaging member involved.

The art of xerography as presently practiced involves the formation of an electrostatic latent image on a photoconductive imaging member which can be in the form of a plate, a drum, or a flexible belt, for example. Materials commonly selected for the photoconductive member contain amorphous selenium, amorphous selenium alloys, halogen doped amorphous selenium, halogen doped amorphous selenium alloys and the like. These photoconductive substances must be of high purity, that is a purity of 99.999 percent or greater, since the presence of contaminants has a tendency to adversely affect the imaging properties of the photoconductive substances, including the electrical properties thereof, causing copy quality obtained from such devices to be relatively poor in comparison to devices wherein high purity substances are selected. Numerous complex processes are known for obtaining photoconductive substances such as selenium, or alloys of selenium, which processes can be classified as chemical processes and physical processes. Flexible photoreceptor devices containing photoconductive substances, such as selenium, prepared in accordance with these processes have a tendency to deteriorate over a period of time and thus, the selenium or selenium alloy used, for example, must be recovered and recycled. Various methods are available for recovering the selenium from the substrate on which it is deposited including heat stripping, water quenching, ultrasonics, and bead blasting.

The prior art processes, including the chemical processes for obtaining high purity elements such as selenium and selenium alloys, from contaminated source materials containing these substances, involve a number of process steps, and undesirably high temperature distillations. Additionally, in many of these processes, the recycling of reactants is not achieved. In most instances, the prior art processes for recovering selenium, selenium alloys, or other metallic elements from contaminated source materials is complex, economically unattractive, causes environmental contamination in that, for example, vaporous oxides are formed and must be eliminated. Additionally, many of these processes result, for example, in the recovery of selenium, or selenium alloys which nevertheless contain impurities that can over an extended period of time adversely effect the photoconductivity of the selenium.

There is described in U.S. Pat. No. 4,047,973, a method for recovering selenium, or an alloy thereof from the surface of an endless xerographic belt containing a metal substrate having deposited thereon a thin layer of an organic resinous material which is overcoated with a relatively thicker layer of selenium or a selenium alloy, by subjecting the surface of the belt to jets of high water pressure for the purpose of stripping the selenium or selenium alloy without substantially effecting the layer of organic resinous material. According to the disclosure of this patent, subsequent to removal of the water from the slurry, there is obtained substantially pure selenium or an alloy thereof. This is an example of a prior art physical process for recovering selenium or selenium alloys.

Other prior art processes of interest with respect to the process of the present invention to be described in detail hereinafter include U.S. Pat. Nos. 4,007,249 and 4,007,255.

In the '249 patent there is disclosed a process for producing stable red amorphous selenium containing a halogen by precipitating selenous acid with hydrazine from a solution thereon in methanol or ethanol. The process is accomplished at a temperature of between about $-20°$ C. and the freezing point of the solution selected. The resulting precipitate is maintained at a temperature of about $-13°$ C. to about $-3°$ C. until a red color appears. The '255 patent contains a similar disclosure with the exception that there is disclosed a process for producing a stable red amorphous selenium material containing thallium. There is reference in both of these patents to processes for precipitating selenium by reducing selenous acid in an aqueous solution with sulphur dioxide or sulphurous acid as described in British Pat. No. 515,676, and U.S. Pat. Nos. 2,186,085 and 3,130,012. Further it is stated in these patents that a process for precipitating selenium from an aqueous solution of selenous acid with sulphur dioxide, hydroxylamine, hydrochloride, or hydrazine sulfate at $6°$ to $45°$ C. is described in U.S. Pat. No. 2,860,954.

Accordingly, there continues to be a need for improved processes for reclaiming or recovering photoconductive metallic materials, such as selenium, arsenic, tellurium, selenium and arsenic, selenium and tellurium, and the like, from source materials including scrap alloys and virgin compositions containing these elements. Additionally, there continues to exist a need for an improved simple low temperature chemical process for obtaining selenium and tellurium in high purities from alloys of selenium and tellurium. There also continues to be a need for improved processes for obtaining selenium and other photoconductive elements in high purity, which processes involve a minimum number of process steps, do not require high temperature distillations, and wherein most of the reactants selected for the process can be recycled and reused. Futhermore, there continues to be a need for improved processes for reclaiming and obtaining selenium, tellurium, and arsenic, in high purity, which processes eliminate pollution hazards associated with some of the prior art processes. More specifically, there continues to be a need for improved processes for obtaining in high purity, selenium, tellurium, arsenic, bismouth, antimony, and other photocondutive elements from scrap or virgin alloys containing these elements as well as from scrap or halogen doped alloys. Furthermore, in accordance with the improved processes of the present invention, selenium, and arsenic can be recovered from scrap or virgin alloys of selenium and arsenic or halogen doped materials containing selenium and arsenic as well as other contaminants.

Also, while numerous processes are known for the preparation and purification of selenium, tellurium, and arsenic, there continues to be a need for improved processes for preparing these materials, which processes can be accomplished at low temperatures, and wherein there results products of high purity. Additionally, there continues to be a need for improved processes for reclaiming selenium, arsenic and tellurium, in high yields from scrap source alloys containing these materials, and other contaminants. Further, there is a need for improved processes for reclaiming photoconductive substances including selenium, arsenic, and tellurium by subjecting to a reduction reaction the corresponding pure esters containing these substances. Moreover, there continues to be a need for improved processes for reclaiming photoconductive substances such as selenium and tellurium from scrap alloys or virgin alloys containing these substances and halogens, such as chlorine, wherein the halogens are eliminated during the process.

OBJECTS OF THE INVENTION

It is an object of the present invention to provide processes for reclaiming photoconductive substances, including selenium, tellurium, and arsenic, from source materials, which overcome the above-noted disadvantages.

In another object of the present invention there is provided an improved process for obtaining selenium, tellurium, and arsenic from source materials, including scrap alloys containing mixtures of these substances, and other contaminants.

A further object of the present invention is the provision of improved processes for separating selenium and tellurium from alloys containing these elements, and other contaminants.

In yet another object of the present invention there is provided improved processes for separating in any proportion, selenium and tellurium from alloys containing these elements and other impurities.

In a further object of the present invention there is provided improved processes for reclaiming selenium, tellurium, and arsenic from scrap alloys, or virgin compositions containing these elements.

In an additional object of the present invention there is provided improved processes for obtaining selenium, tellurium, and arsenic from scrap alloys or virgin compositions containing these elements in combination with halogen materials such as chlorine.

In yet a further object of the present invention there is provided improved processes for reclaiming selenium and arsenic from scrap alloys or virgin compositions containing these elements and other contaminants.

In an additional object of the present invention there is provided improved processes for reclaiming selenium and arsenic from scrap alloys or virgin materials containing selenium, arsenic, and halogen substances such as chlorine.

In still yet a further object of the present invention there is provided improved processes for recovering photoconductive elements including selenium, arsenic, tellurium, antimony, bismuth, cadmium and the like, from source materials containing these elements, and other contaminants by the coreduction of the corresponding pure esters.

These and other objects of the present invention are accomplished by the provision of an improved process for obtaining in high purity photoconductive compositions, including selenium, tellurium, and arsenic which comprises providing a source material, converting the source material into a mixture of corresponding oxides, separating the oxides as pure esters, and subsequently affecting a reduction of the esters. More specifically, the present invention is directed to an improved process for reclaiming or recovering selenium, tellurium, or arsenic, in high purity, 99.999 percent, which comprises providing a source material, such as a scrap alloy containing these elements and other substances, converting this material into a mixture of the corresponding oxides of the elements, reacting the resulting oxides with an alcohol, or a diol, followed by separation of the resulting esters from the reaction mixture, and subjecting, subsequent to purification by distillation, or recrystallization the esters to a coreduction reaction.

In one specific illustrative embodiment the process of the present invention comprises converting a scrap alloy containing selenium, tellurium, arsenic and chlorine, to a mixture of corresponding oxides, followed by treating the mixture with an alcohol for the primary purpose of dissolving the selenium oxide formed. Subsequently, the resulting solution is converted to a dialkyl selenite, for example, to $(RO)_2SeO$, wherein R is an alkyl group, followed by reduction to high purity selenium, 99.999 percent; while the resulting precipitate containing the oxides of tellurium and arsenic oxides are reacted with a diol, resulting in a solution of an arsenic ester and a precipitate of a tellurium ester. The tellurium and arsenic esters, subsequent to purification, are then subjected to a reduction reaction, resulting in the formation of high purity tellurium and high purity arsenic, respectively (99.999 percent).

DESCRIPTION OF PREFERRED EMBODIMENTS

The following specific preferred embodiments of the process of the present invention will now be provided, however, it is not desired to be limited to the process parameters disclosed since other reaction conditions including temperatures, reaction times, and amounts of reactants; sources of materials to be treated, and the like, can be selected providing the objectives of the present invention are achieved.

Initially a source material containing mixtures of selenium, tellurium, arsenic, chlorine and other impurities, such as a scrap alloy available subsequent to the coating of aluminum drums for electrostatographic imaging members are treated with a strong acid. In one specific embodiment, nitric acid is added to the scrap alloy with extensive stirring and slight warming to an appropriate temperature, for example, to a temperature not exceeding 65° C., for sufficient period of time so as to cause complete dissolving of the scrap alloy. Generally, complete dissolution occurs in about 2 hours to about 3 hours, however, lesser or greater times may be necessary depending, for example, on the composition of the scrap alloy, the temperature selected, and the amount of nitric acid used. Generally, about 800 milliliters to about 1,500 milliliters of nitric acid are used for each one pound of scrap alloy being dissolved. Subsequently, the nitric acid is removed by distillation, collected and recycled for later use in the process. During this treatment of the scrap alloy, the chlorine contained therein is removed as hydrogen chloride.

For accomplishing dissolution of the scrap alloys, nitric acid, sulphuric acid, and mixtures thereof can be employed. When mixtures are used, there is contained therein generally from about 80 percent by weight of nitric acid and 20 percent by weight of sulphuric acid, although lesser and greater percentages of mixtures may be selected.

As a result of this treatment there is formed a solution mixture of oxides of selenium, tellurium, and arsenic. This solution is then reacted with an aliphatic alcohol, resulting in a solution of the corresponding selenium ester, $(RO)_2SeO$, and a precipitate of the oxides of arsenic and tellurium. After separation from the reaction mixture the selenium ester is then purified by distillation and the resulting pure ester is subjected to a reduction reaction. Identification and purity of the selenium ester is determined by spectroscopic and analytical methods as known in the art, including infrared, nuclear magnetic resonance (NMR), mass spectroscopy, ultraviolet and elemental analysis, while the purity of the resulting selenium product (99.999 percent), is determined by Emission Spectroscopy. The oxide precipitate is treated as indicated hereinafter.

Generally, the alcohol selected is of the formula ROH, wherein R is an alkyl group containing from 1 to about 30 carbon atoms, and preferably from 1 to about 6 carbon atoms. Illustrative examples of preferred alcohols include those wherein the R group is methyl, ethyl, propyl, butyl, pentyl, hexyl, and the like, with methyl, ethyl and propyl being preferred. Specific illustrative examples of alcohols selected for the process of the present invention include methanol, ethanol, and propanol.

The amount of alcohol used in the treatment process is dependent on a number of factors, including the reaction conditions, the composition of the scrap alloy, and the like, generally, however, there is used for each pound of scrap source material, from about 500 milliliters to about 850 milliliters, and preferably from about 600 milliliters to about 700 milliliters of alcohol.

As an optional step, any water formed by treatment with the alcohol can be removed by azeotropic distillations as known in the art, wherein as azeotropic substances there can be added to the mixture aliphatic or aromatic hydrocarbons, including, for example, cyclohexane, pentane, toluene, benzene, and the like. The primary purpose for substantially removing the water is to provide a better yield of product in some instances, and complete conversion to the selenium ester from the oxides of selenium.

The solution containing the selenium ester $(RO)_2SeO$, a colorless liquid, is subsequent to separation from the reaction mixture purified by distillation, and subjected to a reduction reaction as described, for example, in related copending application U.S. Ser. No. 404,259, filed July 29, 1982, the disclosure of which is totally incorporated herein by reference. In one embodiment thus, the pure selenium ester can optionally be dissolved in a water or an organic solvent such as cellulsolve, ethanol, or the like, followed by reduction with a chemical reducing agent, at a suitable temperature, for example, at a temperature of from about 20 degrees Centigrade, to about 100 degrees Centigrade resulting in the formation of high purity selenium.

Numerous different reducing agents can be selected for accomplishing the reduction of the pure selenium ester. Illustrative examples of chemical reducing agents include hydrazine, sulphur dioxide, hydroxylamine, hydroquinone, thioureas, phosphites, phosphonites, formic acid, ascorbic acid, glycol and the like. The preferred chemical reducing agents are hydrazine, and sulphur dioxide.

Reducing agents, such as hydrazine are generally added to the pure selenium ester in an amount sufficient so as to cause a complete precipitation of selenium in high purity and in high yields, greater than 85 percent. The reduction reaction is generally completed when no further nitrogen is emitted from the reaction mixture as noted, for example, by the absence of bubbling. Generally, equimolar amounts of hydrazine and pure selenium ester are used in the reduction reaction.

With regard to reducing agents such as sulphur dioxide, they can generally be bubbled through the pure ester solution for a period of time sufficient to cause complete formation of a red precipitate. Generally, this occurs within a period of time not exceeding about one to two hours, although periods of time outside this range may be utilized.

Upon completion of the reduction reaction there results a selenium precipitate of a certain color, the specific color produced being dependent on, for example, the reducing agent selected, and the reaction temperature. Thus when hydrazine is the reducing agent, a black precipitate of crystalline selenium results, while when sulfur dioxide is selected as the reducing agent, a red precipitate of amorphous selenium is produced. The desired high purity selenium can then be separated from the reaction mixture by a number of suitable known methods including filtration. Subsequently, as an optional treatment step, the separated selenium can be washed with suitable solvents such as water and cellosolve, followed by allowing the selenium to dry in air. Normally about 500 milliliters or more of washing solvent is selected for each pound of precipitated selenium.

The purity of the selenium, 99.999 percent, obtained in accordance with the process of the present invention, was determined by Emission Spectroscopy. Results obtained with the process of the present invention wherein purity was determined by Emission Spectroscopy are illustrated in Table I that follows.

The precipitate obtained after filtration of the selenium ester contains the oxides of tellurium and arsenic. These oxides are then reacted with a glycol, such as an aliphatic or aromatic diol, including for example, ethylene glycol, 1,2-propylene glycol, 1,3-propylene glycol, 1,2-benzene diol, and the like, resulting in the formation of a precipitate of the corresponding tellurium ester, and a solution of the corresponding arsenic ester. The tetraalkoxytellurane is then purified by recrystallization and the arsenic ester, bis(arsenic triglycollate) is purified by distillation. Subsequent to these purifications, there results pure esters as determined by spectroscopic and analytical analysis.

Diols selected for conversion of the oxides of tellurium and arsenic to the corresponding esters include for example, aliphatic diols of the formula $HO(CR_1R_2)_nOH$ wherein $R_1$ and $R_2$ are hydrogen, or alkyl groups containing from 1 carbon atom to about 30 carbon atoms, and preferably from 1 carbon atom to about 6 carbon atoms, and n is a number of from about 1 to about 10. Illustrative examples of the preferred alkyl groups for the diols include methyl, ethyl, propyl, butyl, pentyl, hexyl, and the like. The preferred R substituents for the diol are hydrogen, methyl, ethyl and propyl. Illustrative examples of preferred diols selected for conversion of the oxides of tellurium and arsenic to their corresponding esters is ethylene glycol, and propylene glycol.

The diol is generally added to the oxides of tellurium and arsenic in a sufficient quantity so as to dissolve the mixture of oxides in the presence of a catalyst, such as p-toluene sulfonic acid. Other catalysts in addition to p-toluene sulfonic acid can be selected for aiding in the reaction of the mixture of oxides, illustrative examples of which include aliphatic and aromatic sulfonic acids, mineral acids, and the like. Dissolving of the oxides is accomplished, for example, by heating and stirring the mixture of oxides and diol under an argon atmosphere, until a clear solution results and the tellurium ester, tetraalkoxytellurane precipitates as white needles on cooling of the solution to room temperature. Subsequent to this treatment the arsenic ester, namely, the bis(arsenic triglycolate) remains in solution.

The tellurium ester, which is believed to be of the formula $(OCH_2CH_2O)_2Te$, when ethylene glycol is selected as the diol reactant or of the formula

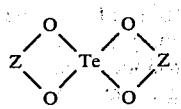

wherein Z is an aromatic moiety, when an aromatic diol is selected, subsequent to recrystallization is subjected to a reduction reaction as described herein with reference to the selenium ester, resulting in the formation of substantially pure tellurium, 99.999 percent pure. The reducing agent selected for the reduction reaction of the tellurium ester include those mentioned herein with reference to reduction of the selenium ester, such as hydrazine, sulphur dioxide, thioureas, and the like.

Generally, the tellurium ester reduction can be accomplished by dissolving the tellurium ester in an organic solvent, such as ethanol, cellosolve, and the like, followed by adding thereto a reducing agent. The reduction of the tellurium ester, subsequent to purification, can be accomplished at various suitable temperatures dependent for example on the reducing agent and solvent selected. Generally the reduction reaction is accomplished at a temperature of from about 25° C. to about 100° C.

The reducing agent is added to the tellurium ester in sufficient amount so as to result in complete reduction of the ester to pure tellurium. Generally, the amount will vary depending on the reducing agent selected, thus, for example, with hydrazine about 60 milliliters to about 70 milliliters per one pound of ester are used, while sulfur dioxide is bubbled through the ester for a period of from about 1 hour to 2 hours until the reaction is complete. The reaction is generally completed with hydrazine when no nitrogen is being emitted, as evidenced by the absence of bubbled in the ester solution, and the formation of a black precipitate of tellurium.

The purity of the tellurium, 99.999 percent, prepared in accordance with the processes of the present invention was determined by Emission Spectroscopy.

The arsenic ester contained in solution, which is believed to be of the formula

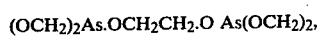

when ethylene glycol is selected as the diol reactant, is subsequent to distillation, subjected to a reduction reaction under substantially identical conditions as described herein with reference to the reduction of the corresponding selenium ester and the corresponding tellurium ester, resulting in a precipitate of arsenic of high purity, 99.999 percent. The identity and the purity of the resulting arsenic ester was determined by a number of known methods, including infrared (NMR), Ultraviolet (UV), and confirmed by elemental and mass spectral analysis; while the purity of the arsenic was determined by Emission Spectroscopy.

Specific process details for forming the tellurium ester and reducing this ester to tellurium of high purity is described in copending application U.S. Ser. No. 404,257, the disclosure of which is totally incorporated herein by reference. The arsenic ester formation, and reduction involves essentially the same process steps as accomplished for formation and reduction of the tellurium ester.

Various different source materials can be selected for treatement in accordance with the process of the present invention in addition to the scrap alloys of selenium, tellurium and arsenic mentioned hereinbefore. Examples of such source materials include photoconductive flexible belts, resulting from the coating operation for the manufacturing of such belts, scrap or virgin alloys of selenium tellurium, selenium arsenic, selenium arsenic and halogen, selenium tellurium and halogen, selenium antimony, selenium antimony tellurium, and the like. Generally, the source materials also contain other contaminants as shown for example in Table I, which contaminants are removed in accordance with the process of the present invention.

Other source materials containing for example, selenium in combination with other elements can be treated in accordance with the process of the present invention. Examples of these elements in addition to those specifically disclosed hereinbefore, include, for example, titanium, gallium, germanium, rhodium, palladium, indium, cadmium, thallium, silver, aluminum, arsenic, boron, barium, bismuth, calcium, cobolt, chromium, copper, iron, mercury, sodium, magnesium, nickel, lead, antimony, tin, silicon, zinc, and the like.

The high purity substances obtained with the process of the present invention, including the high purity selenium, and an alloy containing high purity selenium, high purity tellurium, and high purity arsenic can be selected for use as photoconductive imaging members in electrostatographic imaging systems. Thus, for example, selenium of a 99.999 percent purity obtained in accordance with the process of the present invention can be combined with the high purity arsenic, or the high purity tellurium, for selection as a photoconductive imaging member. These alloys generally contain a substantial amount of selenium, about 75 percent or more, thus alloys comprised of from about 75 percent to about 95 percent by weight of selenium, and from about 5 percent to about 25 percent by weight of tellurium are envisioned. Additionally, alloys containing from about 95 percent to about 99.9 percent of selenium and from about 5 percent to about 0.5 percent by weight of arsenic, can be used. Generally, however, numerous various alloys of any proportions can be selected as the photoconductive member, wherein the elements of the alloy are purified in accordance with the process of the present invention. Examples of other alloys include selenium antimony, selenium cadmium, and the like.

BRIEF DESCRIPTION OF THE DRAWING

There is illustrated in FIG. 1 a flow diagram of an embodiment of the process of the present invention wherein a scrap alloy containing selenium, tellurium, arsenic and chlorine is dissolved in nitric acid, followed by the removal of the hydrogen chloride formed, and removal of the excess nitric acid. As a result of this treatment, there results a mixture of the oxides of selenium, tellurium and arsenic. This mixture is then treated with an alcohol, ROH, resulting in the formation of a solution and a precipitate. The solution contains the dialkylselenite ester of the formula $(RO)_2SeO$, wherein R is an alkyl group. This ester is purified by distillation, and subjected to reduction reaction resulting in the formation of selenium of a purity of 99.999 percent, as determined by, for example, Emission spectroscopy.

The precipitate resulting from treatment of the mixtures of oxides of the alcohol contains the oxides of arsenic and tellurium. These oxides are reacted with a diol, resulting in the formation of a precipitate and a solution. The precipitate is comprised of tetraalkoxytellurane, which after recrystallization for purification purposes is subjected to a reduction reaction, resulting in the formation of tellurium of a purity of 99.999 percent as determined by, for example, Emission Spectroscopy. The solution containing the arsenic ester bis(arsenic triglycollate), subsequent to distillation for purification purposes, is then subjected to a reduction reaction, resulting in arsenic having a purity of 99.999 percent, as determined, for example, by Emission Spectroscopy.

The following examples specifically defining preferred embodiments of the present invention are now provided, which examples are not intended to limit the scope of the present invention, it being noted that various alternative parameters which are not specifically mentioned are included within the scope of the present invention. Parts and percentages are by weight unless otherwise indicated. In the examples, the identity and purity of the isloated esters were determined by infrared, mass spectroscopy, ultraviolet analysis and elemental analysis, while the purity of the reclaimed products was determined by Emission Spectroscopy. Differential-Pulse Polarography was selected for determining the chlorine content.

EXAMPLE I

This example illustrates the conversion of a selenium tellurium alloy containing 25 percent by weight tellurium, into a mixture of their respective oxides.

There was charged into a 150 milliliter round bottom (RB) flask equipped with a reflux condenser, 100 milliliters of concentrated nitric acid. There was then added to the flask 16 grams of a selenium tellurium alloy, containing 25 percent by weight of tellurium, followed by stirring the contents of the flask with a magnetic stirrer, and heating at 70° C. until a clear solution was obtained. Nitric acid was then removed by distillation at 100°–112° C., and any remaining traces of nitric acid were removed under high vacuum. The white residue that resulted was a mixture of selenium dioxide, selenous acid, and tellurium dioxide.

The mixture of oxides collected was then separated in accordance with the procedure as outlined in Example II.

EXAMPLE II

The mixture of oxides obtained in accordance with the process of Example I was charged to a 500 milliliter RB flask equipped with a reflux condenser, as reflexed with 150 milliliters of absolute ethanol for 2 hours, during which time a slurry, slightly grey in color, was obtained. After cooling this slurry to room temperature, it was filtered. The precipitate, of tellurium oxide, as determined by spectroscopic and analytical methods, was collected, washed with 50 milliliters (2×25 ml.) of absolute ethanol, and dried. The filtrate which was a solution of selenium oxides in ethanol was also collected. This solution was converted to diethyl selenite in accordance with the process of Example III.

EXAMPLE III

This example is directed to the conversion of the above filtrate to diethyl selenite.

The clear liquid filtrate of Example II, was charged to a 500 milliliter RB flask equipped with a Dean-Stark reflux column. Benzene 150 milliliters was then added to the solution, followed by refluxing the contents of the flask under an argon atmosphere. The refluxing was continued until no water was collected in the column, about 5 hours. The excess ethanol and benzene were removed by distillation, and the residue was fractionally distilled under high vacuum. Pure diethyl selenite, as determined by infrared, mass spectroscopy, and elemental analysis, which distills at 75°–76° C./11 mm. of mercury was collected. The yield of diethyl selenite was 72 percent (22 grams). The residue which remains in the distillation flask can be recycled, and another portion of diethyl selenite can be obtained.

EXAMPLE IV

This example describes the reduction of the diethyl selenite ester obtained in Example III, with hydrazine.

The diethyl selenite ester prepared in accordance with the process of Example III was dissolved in 50 milliliters of cellosolve, and charged into a 250 milliliter round bottom (RB) flask equipped with a reflux condenser and an additional funnel. There was then added in a dropwise manner to the flask 5 grams of hydrazine in 15 milliliters of cellosolve. A black precipitate results which was separated by filtration and collected. The collected precipitate was then washed with cellosolve 50 milliliters (2×25 ml.), dried and weighed. There was obtained 8.5 grams, 98 percent yield, of selenium having a purity of 99.999 percent, and no tellurium conamination, as determined by Emission Spectroscopy.

EXAMPLE V

This example describes the conversion of tellurium oxide prepared in accordance with Exaple II, to tetraalkoxytellurane.

The tellurium oxide precipitate prepared in accordance with Example II was charged to a 125 milliliter round bottom (RB) flask equipped with a reflux condenser. Ethylene glycol, 55 milliliters (ml) and 0.5 grams of p-toluene sulfonic acid was then added to the flask. The reaction mixture was stirred, and heated under an argon atmosphere, first at 95° C. for 2 hours, and then at 145° C. for 5 minutes. The resulting clear solution was allowed to stand at room temperature for 5 hours. Tetraalkoxytellurane which separates out as a white crystalline compound and is recrystallized from cellosolve. The amount of pure tetraalkoxytellurane collected was 6.5 grams. The identity, purity and structure of the tetraalkoxytellurane was established by spectral (infrared, NMR, and the like) and analytical analysis.

EXAMPLE VI

This example describes the reduction of the tetraalkoxytellurane material prepared in accordance with Example V to high purity tellurium.

Tetraalkoxytellurane prepared in accordance with Example V was dissolved in 150 milliliters of cellosolve by warming. The tellurane was then reduced by dropwise addition, over a period of ten minutes, of a solution of 7 grams of hydrazine in 25 milliliters of cellosolve. The reaction was exothermic and $N_2$ gas evolved. High purity tellurium precipitates out as black powder and is collected by filtration, washed with cellosolve, and dried. A total of 3.24 grams, 98 percent yield, of tellurium of a purity of 99.999 percent was obtained. Emission spectral analysis indicated that the material did not have any selenium carry-over, and had only the following contaminations: Ca, 3 ppm; Mg, 5 ppm; and Si, 3 ppm; Sb, 1 ppm; Fe, 1 ppm; Al, 1 ppm.

EXAMPLE VII

This example describes the conversion of a scrap alloy containing selenium, tellurium, arsenic, and chlorine, to a mixture of oxides of selenium, tellurium, and arsenic.

There was added in small portions over a period of 30 minutes, to a 2 liter round bottom (RB) flask containing 1,500 milliliters of concentrated nitric acid, 453 grams of a scrap alloy containing selenium, over 95 percent by weight, tellurium, arsenic, and chlorine, about 500 ppm. The reaction was exothermic as evidenced by the evolving of nitrogen gas during the addition of the alloy to the flask. Upon completion of the addition, the contents of the flask were warmed to about 50° C., with stirring, until a clear solution results. Nitric acid was then distilled off at 100°–112° C. and any traces of nitric acid were removed under high vacuum. The remaining white residue was a mixture of oxides of selenium, tellurium and arsenic.

EXAMPLE VIII

In this Example, selenium oxides prepared in accordance with Example VII are separated from the mixture of oxides in accordance with the following process.

The mixtures of oxides obtained in accordance with the process of Example VII was boiled with 800 milliliters of absolute ethanol for 2 hours. The resulting grey slurry was cooled to room temperature and filtered. The precipitate, which was a mixture of oxides of tellurium and arsenic was collected, washed with 100 milliliters (4×25 ml.) of ethanol and dried. The filtrate, which was a solution of selenium oxide and selenous acid in ethanol, was collected.

EXAMPLE IX

This example describes the conversion of the solution of oxides of selenium, prepared in accordance with Example VIII into diethyl selenite.

The filtrate of Example VIII was charged into a 2 liter round bottom (RB) flask equipped with a Dean-Start reflux column. Benzene 600 milliliters was added and the contents of the flask were refluxed under an argon atmosphere. The refluxing was continued until no water collects in the column, about 20 hours. The excess ethanol and benzene were removed by distillation, and the residue was fractionally distilled under high vacuum. Diethyl selenite (769 g.) distilling at 82° C./12 mm of mercury was collected. The grey residue left in the reaction flask after distillation of the ester was again dissolved in absolute ethanol (800 ml.) and benzene (600 ml.). The water was removed by an azeotropic distillation and an additional crop of 205 grams of diethyl selenite was obtained. The total yield of diethyl selenite was 974 grams (92 percent approximately).

The pure diethyl selenite obtained was identified by nuclear magnetic resonance, infrared, and mass spectroscopy.

EXAMPLE X

This example describes the reduction of the diethyl selenite prepared in accordance with the process of Example IX, with hydrazine in an organic media.

A solution of pure diethyl selenite 400 grams, prepared in accordance with Example IX, in cellosolve (500 ml.) was charged to a 3-liter, 3-necked RB flask equipped with a reflux condenser, graduated addition funnel, and a Teflon paddle stirrer. A solution of 85 grams of hydrazine in 100 milliliters of cellosolve was added dropwise through an addition funnel to the stirring solution of the selenite. The addition was completed in approximately 1 hour. The resulting selenium black precipitate, 169 grams, 99 percent yield, was collected by filtration with a sintered glass filter, washed with 100 milliliters (4×50 ml.) of cellosolve, dried and weighed. Emission Spectroscopy indicated a selenium purity of 99.999 percent.

Also, emission spectral analysis indicated that the resulting precipitate had only the following contaminations: Al, 1 ppm; Ca, 3 ppm; Cu, 0.2 ppm; Fe, 2 ppm; Mg, 10 ppm; and Si, 10 ppm. A differential-pulse polarography analysis indicated that the selenium did not have any chlorine carry-over.

EXAMPLE XI

This example describes the reduction of the diethyl selenite prepared in accordance with Example IX with sulfur dioxide in an aqueous media.

Sulfur dioxide gas was slowly bubbled at room temperature through a solution of 400 grams of diethyl selenite in 1000 ml. of deionized water conained in a 2 liter Erlenmeyer flask. Red precipitates of amorphous selenium start separating out. Sulfur dioxide was then bubbled through the above red slurry for 2 hours. The red precipitate was then collected by filtration, washed several times with water until the washings are neutral (PH=7). The precipitation was then vacuum dried and weighed. A total yield of 65 percent, (110) of red amorphous selenium was obtained. The yield can be improved by increasing the reaction temperature and by bubbling sulfur dioxide until no further red color develops. Emission spectral analysis indicated that the resulting selenium product had only the following contaminations: Fe, 1 ppm; Mg, 5 ppm; and Si, 5 ppm, and that the selenium obtained had a purity of 99.999 percent.

EXAMPLE XII

This example is directed to the separation of tellurium and arsenic esters from the mixture of their oxides prepared in accordance with Example VIII.

The grey precipitate resulting from the process of Example VIII, weighing approximately 10 grams was charged to a 250 milliliter RB flask equipped with a reflux condenser. Ethylene glycol 100 ml. and p-toluene sulfonic acid 2 grams were added to the above flask. The contents of the flask were heated and stirred under argon atmosphere at 90° C. for 2 hours and then at 145° C. for 5 minutes. The reaction mixture was filtered while hot. The filtrate, on standing at room temperature for 5 hours, resulted in a white crystalline compound which was isolated by filtration and recrystallized from cellosolve, resulting in 3.2 grams of tetraalkoxytellurane. The filtrate which contains bis(arsenic triglycolate) was discarded.

EXAMPLE XIII

This example is directed to the reduction of tetraalkoxytellurane obtained in accordance with the process of Example XII with hydrazine in an organic media.

Pure tetraalkoxytellurane 3 grams prepared in accordance with Example XII was reduced to high purity tellurium as described in Example V. Emission spectral analysis indicated that the precipitated tellurium has only the following contaminations: Ca, 2 ppm; Cd, 2 ppm; Mg, 4 ppm; and Si, 1 ppm, and that the tellurium obtained had a purity of 99.999 percent.

EXAMPLE XIV

This example is directed to the reclaimation of high purity selenium (99.999 percent) from a scrap alloy containing selenium, arsenic, in an amount of 0.1 to 5 percent.

A scrap alloy, 100 grams, containing selenium, arsenic, 0.1 to 5 percent, and chlorine, about 5 to 500 ppm, was converted to a mixture of oxides of selenium and arsenic in accordance with the procedure as described in Example VII. The resulting selenium oxide was then separated from oxides of arsenic by treating the mixture with 200 milliliters of absolute ethanol, followed by filtration in accordance with the procedure as described in Example VIII. The precipitate containing arsenic oxides was discarded.

The solution of selenium oxides in absolute ethanol was then converted to diethyl selenite with 150 milliliters of benzene in accordance with the procedure of Example IX. There resulted 198 grams of diethyl selenite. The pure diethyl selenite obtained was then dissolved in 300 milliliters of cellosolve, followed by reduction with a solution of 65 milliliters of hydrazine in 100 milliliters of cellosolve in accordance with the procedure as described in Example X. There resulted 83 grams, 82 percent yield, of selenium, having a purity of 99.999 percent as determined by Emission Spectroscopy. Additionally, emmission spectral analysis indicated that the resulting selenium material recovered had the following contaminations: Al, 1 ppm; Ca, 3 ppm; Cu, 0.3 ppm; Fe, 2 ppm; Mg, 5 ppm; and Si, 3 ppm. Differential pulse polarography indicated that the resulting selenium did not have any chlorine contamination.

There is illustrated in Table 1 that follows as indicated hereinbefore, an analysis of the constituents present in the resulting high purity products resulting from the process of the present invention as described in Examples I–XIV. In this Table:

The numbers (*) reported represent values in parts per million (ppm), while the blanks signify that the element indicated was undetectable. The phrase "Balance" signifies that the element indicated comprised the remaining part of the composition, thus the total of all elements would equal 100 percent or 1 million parts. Samples designated 1, 2 and 3 are for reclaimed selenium, and reclaimed tellurium from a scrap alloy containing selenium, tellurium, arsenic and chlorine, and other metallic and non-metallic contaminations.

The values reported for Sample 4 are for reclaimed tellurium from a virgin tellurium selenium alloy containing 25 percent by weight of tellurium.

The values represented for Sample 5 are for reclaimed selenium from a virgin selenium tellurium alloy.

The values for Sample 6 are for a scrap alloy containing selenium, arsenic, chlorine and other metallic and non-metallic contaminations.

It is believed that the impurities silicon, (Si), magnesium (Mg), and calcium (Ca), resulted from the glass apparatus selected for the process described.

TABLE I

The values reported in this table are based on a spectroscopic and analytical analysis of the products prepared in accordance with the process of the present invention as described in Examples IV, VI, XI, XIII and XIV.

SAMPLE IDENTIFICATION

| ELEMENTS | 1 | 2 | 3 | 4 | 5 | 6 |
|---|---|---|---|---|---|---|
| Ag | . | . | . | . | . | . |
| Al | . | *2(ppm) | . | 1 | . | 1 |
| As | . | . | . | . | . | . |
| B | . | . | . | . | . | . |
| Ba | . | . | . | . | . | . |
| Bi | . | . | . | . | . | . |
| Ca | 1 | 1 | 2 | 3 | 1 | 3 |
| Cd | . | . | 2 | . | 2 | . |
| Co | . | . | . | . | . | . |
| Cr | . | . | . | . | . | . |
| Cu | . | 0.2 | . | . | 0.5 | 0.3 |
| Fe | 1 | 2 | . | 1 | 5 | 2 |
| Hg | . | . | . | . | . | . |
| Na | . | . | . | . | . | . |
| Mg | 5 | 3 | 4 | 5 | 10 | 5 |
| Mn | . | . | . | . | . | . |
| Mo | . | . | . | . | . | . |
| Ni | . | . | . | . | . | . |
| Pb | . | . | . | . | . | . |
| Sb | . | . | . | 1 | . | . |
| Sn | . | . | . | . | . | . |
| Si | 5 | 7 | 1 | 3 | 10 | 3 |
| Te | . | . | Balance | Balance | . | . |
| Ti | . | . | . | . | . | . |
| Tl | . | . | . | . | . | . |
| Zn | . | . | . | . | . | . |
| Se | Balance | Balance | . | . | Balance | Balance |

The high purity selenium prepared in accordance with the process of Examples I–XIV was then formulated into a imaging member by vacuum depositing such selenium on an aluminum substrate, the selenium being present in a thickness of about 50–60 microns, and the aluminum substrate being present in a thickness of about 2,000 to 3,000 microns. Subsequently, the selenium member is charged positively and subjected to imagewise exposure. The resulting latent electrostatic image is then developed with a toner composition comprised of a styrene/n-butylmethacrylate copolymer (58/42), 90 percent by weight and 10 percent by weight of carbon black. Excellent quality images resulted after 100 imaging cycles.

Additionally, an alloy containing selenium in an amount of 75 percent by weight, and tellurium in an amount of 25 percent by weight, which elements are of a purity of 99.999 percent, and are prepared in accordance with Examples I to XIV were formulated into an imaging member by vacuum depositing a mixture of these elements 50–60 microns in thickness on an aluminum substrate, 2,000 to 3,000 microns in thickness. Subsequently, the imaging member containing selenium and tellurium are charged positively and subjected to imagewise exposure. The resulting latent image is then developed with a toner composition comprised of a styrene/n-butylmethacrylate copolymer, 90 percent by weight and 10 percent by weight of carbon black. Excellent quality images resulted after 100 imaging cycles.

Other modifications of the present invention will occur to those skilled in the art based upon a reading of the disclosure of the present application, and these modifications are intended to be included within the scope of the present invention.

I claim:

1. A process for obtaining selenium, tellurium and arsenic in high purity, which comprises providing a source material containing selenium, tellurium and arsenic, treating the source material with a strong acid, reacting the resulting product with an alcohol wherein a solution of a selenium ester is formed, and a precipitate of the oxides of the tellurium and arsenic results, subjecting the selenium ester solution subsequent to distillation to a reduction reaction, resulting in the formation of substantially pure selenium, reacting the tellurium and arsenic oxides percipitate with a diol, resulting in the formation of a precipitate of a tellurium ester, and a solution of an arsenic ester, followed by subjecting, subsequent to purification the tellurium ester and the arsenic ester to reduction reactions.

2. A process in accordance with claim 2 wherein the source material is a scrap alloy containing selenium, tellurium, arsenic and chlorine, and the strong acid is nitric acid.

3. A process in accordance with claim 2 wherein the chlorine is removed subsequent to reaction with the acid.

4. A process in accordance with claim 1 wherein there results subsequent to the reaction of the scrap alloy and acid a mixture of oxides of selenium, tellurium, and arsenic.

5. A process in accordance with claim 1 wherein the alcohol is of the formula ROH, wherein R is an alkyl group containing from about 1 to about 30 carbon atoms.

6. A process in accordance with claim 5 wherein R is from 1 to about 6 carbon atoms.

7. A process in accordance with claim 6 wherein R is methyl, ethyl or propyl.

8. A process in accordance with claim 7 wherein the alcohol is methanol.

9. A process in accordance with claim 7 wherein the alcohol is ethanol.

10. A process in accordance with claim 1 wherein the diol is of the formula $HO(CR_1R_2)_2OH$, wherein $R_1$ and $R_2$ are independently selected from the group consisting of hydrogen and alkyl groups containing from about 1 to about 6 carbon atoms, and n is a number of from 1 to about 10.

11. A process in accordance with claim 10 wherein the diol is ethylene glycol.

12. A process in accordance with claim 1 wherein the selenium ester is of the formula $(RO)_2SeO$, wherein R is an alkyl group containing from 1 to about 30 carbon atoms.

13. A process in accordance with claim 12 wherein R is an alkyl group containing from 1 to about 6 carbon atoms.

14. A process in accordance with claim 1 wherein the arsenic ester is of the formula

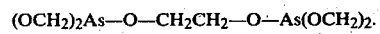

$(OCH_2)_2As-O-CH_2CH_2-O-As(OCH_2)_2$.

15. A process in accordance with claim 1 wherein the tellurium ester is of the formula

$(OCH_2CH_2O)_2Te$.

16. A process in accordance with claim 1 wherein the tellurium ester is of the formula

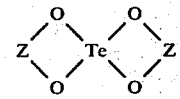

wherein Z is an aliphatic or aromatic moiety.

17. A process in accordance with claim 1 wherein the reducing agent is selected from hydrazine and sulphur dioxide.

18. A process in accordance with claim 1 wherein the acid is added in an amount of from about 800 milliliters to about 1,500 milliliters.

19. A process in accordance with claim 1 wherein the diol is added in a sufficient amount so as to cause the formation of a clear solution.

20. A process in accordance with claim 19 wherein the diol is added in an amount of from about 600 milliliters to about 700 milliliters.

* * * * *